Oct. 10, 1950     J. P. HENDERSON     2,525,261
REFRIGERATED BALL DISPENSER
Filed Sept. 30, 1946     2 Sheets-Sheet 1
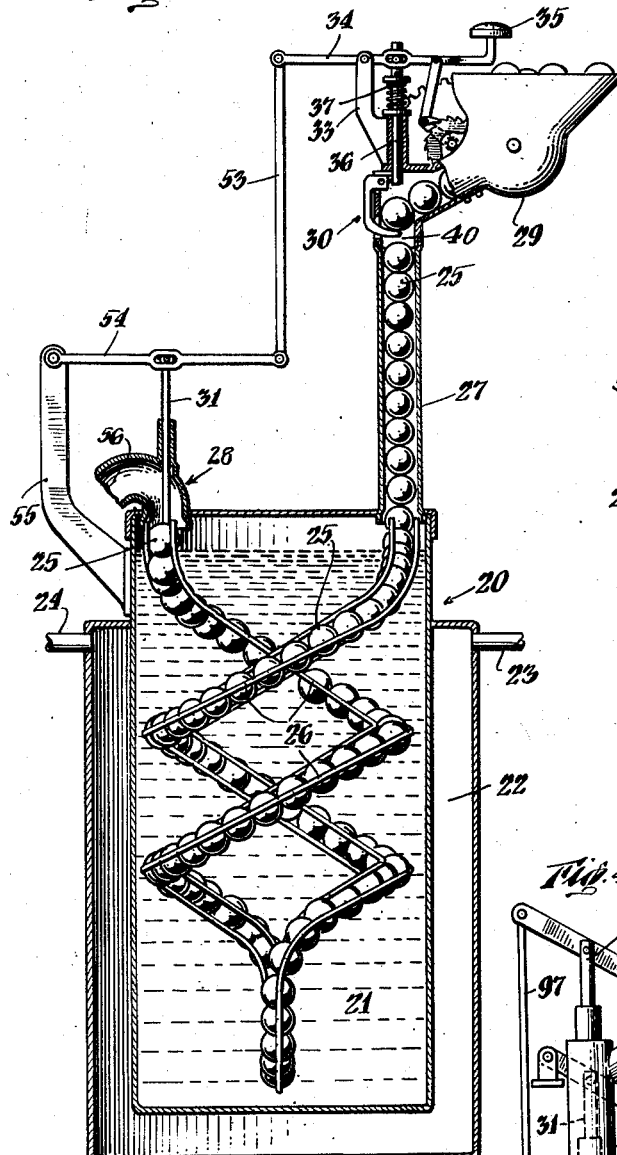
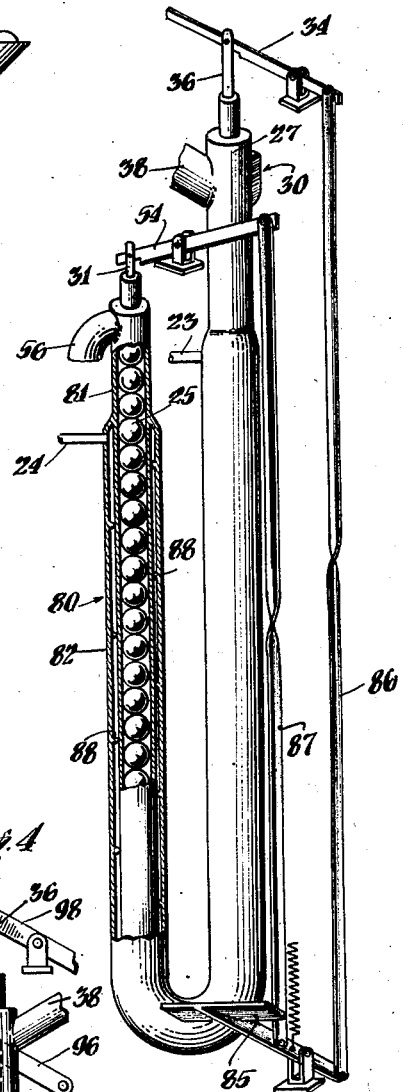
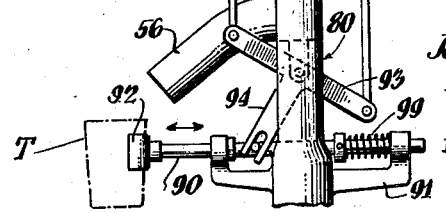
INVENTOR.
James P. Henderson
BY Duell & Kane
ATTORNEYS

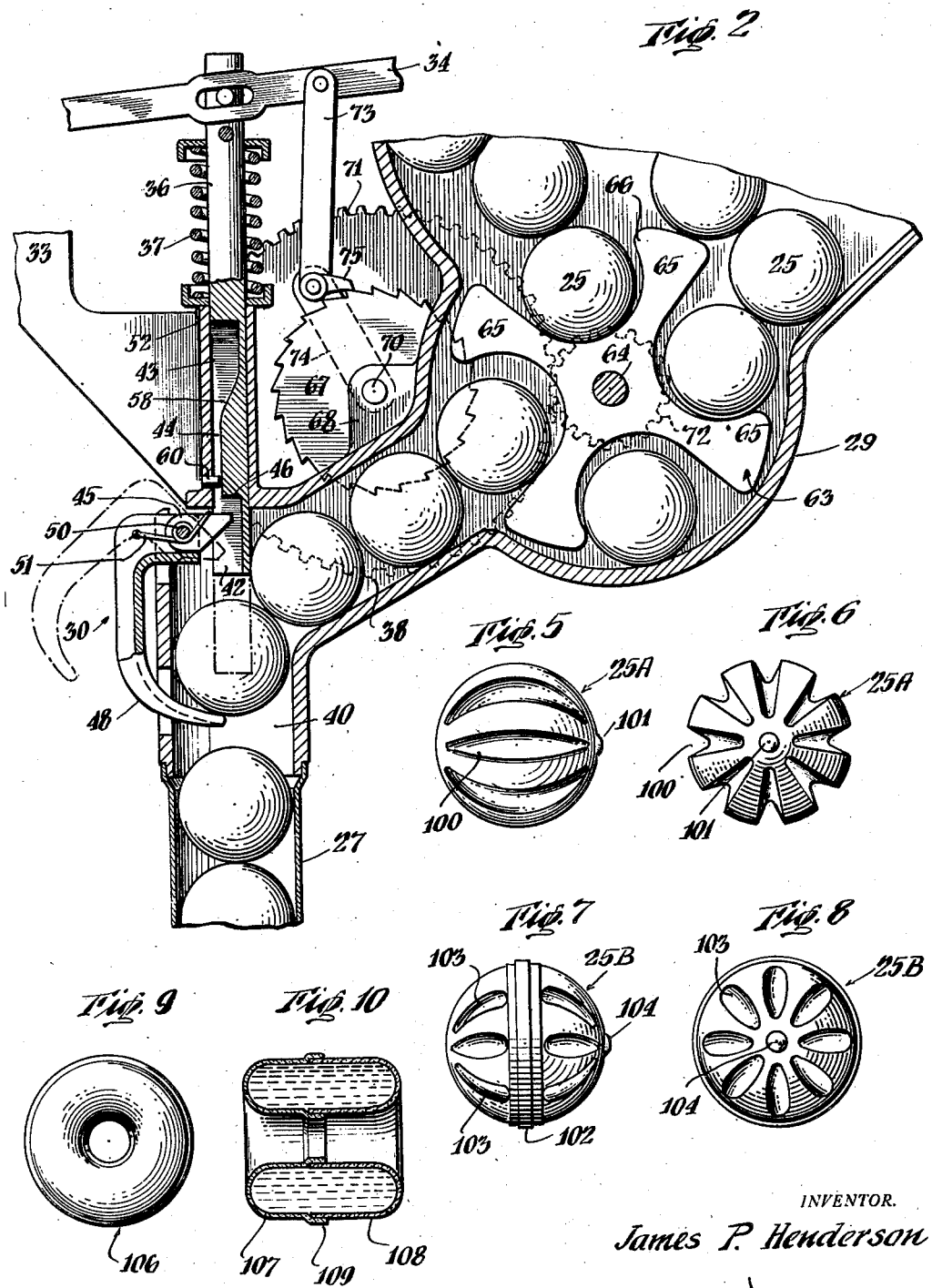

Patented Oct. 10, 1950

2,525,261

UNITED STATES PATENT OFFICE 2,525,261

REFRIGERATED BALL DISPENSER

James P. Henderson, Brooklyn, N. Y.

Application September 30, 1946, Serial No. 700,269

5 Claims. (Cl. 312—36)

This invention relates to an improved refrigeration unit and particularly to apparatus within which the liquid content of a plurality of receptacles—preferably of relatively small size—may be frozen or chilled to a desired low temperature, and from which the receptacles may be dispensed as desired.

It is a principal object of the invention to provide an apparatus wherein a plurality of containers of liquid are caused to pass through a freezing bath to freeze the liquid content of said containers, and are automatically ejected or discharged for use.

It is another object of the invention to provide apparatus for the production of ice-containing receptacles to be used in lieu of ice cubes in chilling beverages, said apparatus storing said receptacles with their contents in frozen state and having means for automatically dispensing the receptacle into a glass or other beverage container.

It is an object of the invention to provide an apparatus having a tank or chamber of liquid maintained at a subfreezing temperature, and a guideway or trackway therein through which a plurality of liquid-containing receptacles may be conducted to freeze or chill the contents thereof.

It is an object of the invention to provide means for feeding a plurality of liquid-containing receptacles into a freezing compartment and for ejecting one or more of the receptacles therefrom for subsequent use as a freezing or chilling medium.

It is an object of the invention to provide means for passing liquid-containing receptacles through a freezing medium, and for correlating the introduction of a receptacle into said freezing medium with the withdrawal of a receptacle therefrom.

It is another object of the invention to provide means whereby small-size substantially spherical receptacles containing liquid to be frozen may be fed from a hopper into and through a freezing bath.

It is yet another object of the invention to provide a hopper or reservoir for a group of receptacles to be fed in single file through a conduit, with means for agitating the contents of the hopper so that such contents will not bridge or jam within the hopper to prevent passage therefrom.

It is another object of the invention to provide means by which receptacles may be fed into and discharged from a freezer unit by the operation of a single actuator device such as a hand lever, foot pedal, or the like.

It is an object of the invention to provide an improved receptacle for containing a volume of liquid to be frozen or brought to a desired low temperature.

It is yet another object of the invention to provide a receptacle having a wall configuration which permits of flexibility and expansion to prevent damage of the receptacle upon the freezing of the liquid content thereof.

It is an object of the invention to provide a seamless receptacle of light metal, said receptacle being completely closed except for a small fill opening, and having deeply indented sidewalls.

Other features and advantages will hereinafter appear from the following detailed description of the invention.

In the drawings:

Fig. 1 is a partially schematic side elevation of one form of the invention;

Fig. 2 is an enlarged detail, in vertical elevation, of the feeding means pursuant to which the receptacles are caused to be fed into the freezer;

Fig. 3 is a perspective of another embodiment of the invention, a portion thereof being broken away to show underlying structure;

Fig. 4 is a somewhat schematic side elevation of the apparatus of Fig. 3, showing a modified form of automatic dispenser;

Figs. 5 and 6 are respectively a side and an end elevation of one form of liquid containing receptacle;

Figs. 7 and 8 are relatively a side and a front elevation of a second form of liquid receptacle;

Fig. 9 is an end view of a liquid receptacle having toroidal shape; and

Fig. 10 is a section taken transversely through the receptacle of Fig. 9.

In the embodiment shown in Fig. 1, the apparatus 20, shown in vertical sectional elevation, includes a refrigeration chamber which may comprise a tank 21 containing a volume of a suitable liquid having a low freezing point. Any suitable and conventional means may be provided to chill the liquid to a low temperature, such as zero degrees F., and to maintain said temperature within reasonably close limits; schematically the refrigerant means is illustrated as a jacket 22 through which refrigerant flows as provided by inlet and outlet conduits 23, 24. It will be understood that the refrigerant means may comprise a suitable evaporator unit or circulating coils disposed within the tank, and that the tank is lagged or otherwise suitably thermally insulated. No supporting framework for the unit 20 has been shown in that it forms no part of the invention.

The freezing bath in tank 21 may be of any material which will be freely flowing at the attained low temperature. It is contemplated that the invention will find a wide field of use in providing ice-containing spheres or capsules to be used in place of ice cubes in cold drinks, and inasmuch as said spheres will be placed in the beverage, the freezing bath should be of material which will not be deleterious. A suitable mixture of grain alcohol and water is presently preferred. Such a mixture has antiseptic properties which will sterilize the spheres during their immersion therein.

The spheres or capsules 25 have a water content, as later described, and are guided through the freezing bath in a tortuous path to insure a period of immersion suitable to freeze their water content. Suitable guiding means for the spheres may comprise a slotted or perforated tube, or the illustrated organization of three equiangularly spaced rods 26 which are suitably supported and form a descending helix fed from the reservoir tube 27 and an ascending helix which discharges into the outlet fitting 28.

Whatever type of trackway is used should be shaped to afford wide radius curves, should freely guide the passage of the spheres and expose maximum area of the spheres to the freezing bath.

The reservoir tube 27 is fed from a hopper 29 with an interposed control gate assembly 30. The spheres 25 are of a calculated cubage and water content to give them a positive buoyancy in the bath, which assists the upward movement. However, such movement is also aided in substantial degree by the weight of the spheres in the tube 27, which extends to a suitable extent above the level of the bath.

The spheres 25 are preferably partly filled with water and the spheres suitably sealed. The amount of water contained in a sphere is such that the combined weight of the sphere and its water content is less than the weight of the tank liquid displaced by the sphere so that each sphere has a positive buoyancy. Alternatively, the spheres may be indented or otherwise configurated to provide a flexible structure which will expand as its water content freezes. In such form, the sphere may be filled with water to its capacity. By proper selection of material and wall thickness, the weight of the sphere alone can be made sufficiently small to give the receptacle positive buoyancy when its capacity filling of water is frozen and the sphere has been increased in volume due to the expansion of the ice.

Introduction and removal of the spheres is controlled by gate 30 and a release pin 31, which are arranged for conjoint operation by suitable linkage. Referring to Figs. 1 and 2, a bracket 33 pivotally supports an actuator lever 34, one end of which has any conveniently arranged actuator handle 35. A gate actuator plunger 36 is pivotally linked to lever 34 by means such as the illustrated pin and slot connection. As shown in Fig. 1, the freely supported position of plunger 36—under the urging of spring 37 or equivalent—is such that it is out of the path of the spheres as they descend through the throat tube 38 of hopper 29.

In Fig. 2, the plunger 36 has been partially depressed to interpose its end in the path of a sphere in throat 38 pending the release by gate 30 of the sphere held by it in the gate chamber 40.

Plunger 36 is provided for a substantial portion of its lower end, with a pair of relatively deep slots 42, 43, interconnected by a passage slot 44. Said slots 42, 43 accommodate a gate actuator 45, the nose of which will be engaged by the wall 46 defining the upper limit of slot 42. Gate lever 48 is pivoted to the upper wall portion of the gate chamber and projects into said chamber through slotted openings in the side wall thereof. Said gate lever is channelled to receive the actuator 45 which pivots on the gate lever pivot 50. The actuator is so shaped and related to the gate lever that it is held against clockwise rotation independently of lever 48, but may independently rotate over a limited counterclockwise arc. A spring 51 biases actuator 45 in a clockwise direction.

It will be seen that as plunger 36 descends within its guideway 52 its end will first block off the lowermost sphere in throat 38, and then the wall 46 of slot 42 will engage the nose of actuator 45 and will thereby rotate the gate lever 48 counterclockwise about pivot 50, disengaging the end of the gate from the sphere held by it, to permit it to drop.

Continued downward movement of the plunger 36 will force the sphere released by the gate into the tube 27 and will urge the series of spheres along the trackway in the bath.

It will be obvious from Fig. 1 that movement of the series of spheres is ordinarily restrained by the engagement of the release plunger 31 with the uppermost sphere in the discharge track. However, by means of the interconnecting link 53 the release plunger actuating lever 54 is rotated counterclockwise about its pivot support on the bracket 55. Such rotation of lever 54 and the resultant lifting of plunger 31 will be in advance of the engagement of the plunger 36 with the sphere, and the continued downward movement of the plunger 36, accompanied by the continued upward movement of the plunger 31 will withdraw the latter plunger from the path of movement of the sphere 25 and permit said sphere to discharge through the outlet 56 into a glass or other receptacle held beneath the outlet. The discharge of course will be enforced by the downward pressure exerted upon the spheres within the tube 27 by the plunger 36, assisted by the inherent buoyancy of the spheres within the helical track. As the plunger 36 is driven downwardly, the rotation of the gate lever 48 permits the nose of the actuator 45 to pass along the passage 44 and into the slot 43, at which point the gate lever 48 will rotate counterclockwise to return its end into the gate chamber 40. The plunger itself has at that time prevented another sphere from entering the said gate chamber. On the return stroke of plunger 36, the cam surface 58 of the pocket 43 engages with the sloping bottom surface of the actuator 45, and since said actuator is permitted movement in a counterclockwise direction, the actuator is displaced to permit such plunger return until the actuator again snaps into the pocket 42. Preferably the sleeve 52 has a pin or projection 60 of slightly less width than that of the slots 42, 43 and 44, to prevent rotation of the plunger 36. Pin 60 may also serve to limit the downward movement of the slot by engagement with the upper edge of slot 43. The position of pin 60 permits sufficient downward movement of plunger 36 to move a sphere downwardly to a distance greater than its diameter.

As the plunger 36 is returned to its original position its end frees the lowermost sphere within the throat 38 and permits said sphere to drop into the gate chamber 40, where it comes to rest against the end of the lever 48.

It has been found that the supply of spheres within the hopper 28 may bridge or compact in such fashion as to block off the entrance to the throat 38 and prevent the passage of a sphere into the throat. To circumvent this, the hopper is provided with an agitator 63 pivotally supported on a suitable shaft 64 journaled in the side walls of the hopper. Said agitator consists preferably of four vanes or lobes 65, the spacing between which is sufficient to loosely accommodate a sphere. It will be seen that each lobe has a forwardly projecting nose 66 which tends to direct the sphere toward the center of the agitator, there being sufficient clearance to accomodate such movement. It should also be noted that the maximum diameter of the agitator is such that it does not project into the throat 38 during the agitator rotation. Hence if by some chance the gate did not release a sphere for movement into and through the tube 27, the agitator would merely move a sphere contained between its vanes in a circular path without exerting any crushing or compacting pressure thereon.

The agitator is arranged for intermittent rotation upon operation of the handle 35 by means of a pawl and ratchet organization. A ratchet 67 is pivoted on a web 68 suitably provided on the hopper structure, and the shaft 70 thereof is fixed to a gear 71 so that the ratchet and gear rotate together. Gear 71 meshes with a gear 72 fixed to the end of the agitator shaft 64. A linkage comprising pivotally connected arms 73, 74, at the juncture point of which the pawl 75 is pivoted operates the pawl in counterclockwise direction as lever 34 is pressed downwardly. On the return stroke the pawl 75 urges the ratchet and its gear 71 into clockwise rotation, which causes the agitator 63 to rotate counterclockwise to attain a point where a sphere is suitably disposed at the mouth of the throat 38 for entry thereinto.

The embodiment of Fig. 3 differs structurally from that of Fig. 1 essentially in that the unit 80 comprises a tube 81 which contains the chilling bath and through which the spheres 25 pass. The necessary low temperature of the chilling bath is maintained by providing jacket 82 which defines a wall space through which a refrigerant is introduced and discharged by the respective conduits 23, 24.

It will be understood that to reduce the overall height of this apparatus it may be arranged in a large curvature helical spiral to effect the necessary length of travel of the spheres through the freezing bath. In any event the reservoir tube 27 of suitable height above the level of the chilling bath is provided, and it is contemplated also that a hopper 29 (not shown) and gate 30 will provide for the controlled introduction of spheres into the unit, as previously set forth.

Fig. 3 somewhat schematically shows a foot pedal apparatus pursuant to which the respective levers 34 and 54 may operate the feed plunger 36 and the release plunger 31. Accordingly, a foot pedal 85 is suitably pivotally mounted and carries at opposite sides of its pivot point the respective actuator links 86, 87 with which the levers 34 and 54 are associated. Foot pressure on pedal 85 will rotate pedal 84 to drive plunger 36 downwardly and will rotate lever 54 to raise plunger 31 to permit the expulsion of a sphere from the discharge spout 56.

To insure proper circulation of the refrigerant about the tube 81, while supporting the tube 82 in suitable spaced relationship therewith, it is contemplated that a spiral rib 88 will be provided in the annular space between the respective tubes 81 and 82. It will be appreciated that the showing of Fig. 3 is schematic as to framework and structural supports for the pivots, and also that the insulation or lagging has not been shown.

Fig. 4 shows a partial side elevation of the apparatus 80 of Fig. 3 arranged for operation of the receptacle feeding and ejection control by a reciprocating rod 90 mounted in a suitably affixed bracket 91. An arcuate fork 92 is of such size as to partially embrace a tumbler T which is pressed thereagainst. The position of the tumbler when within the fork 92 is in alignment with the outlet of the discharge spout 56, after the tumbler and rod 90 have been manually pushed to the right of Fig. 4.

Suitably pivotally supported in the space between the respective legs of the structure 80 is a walking beam 93 having an arm 94 which engages the rod 90 with a pin and slot connection so that the inward propulsion of the rod will effect a counterclockwise rotation of the beam. To one end of the beam 93 is pivotally secured a rigid link 95, the upper end of which engages with a lever 96, pivotally supported, and articulated with the release plunger 31. To the opposite end of the beam 93, a second pivot link 97 is arranged to actuate the pivotally supported lever 98, with which is operatively associated the feed plunger 36.

The operation of the Fig. 4 structure is apparent: as a tumbler is held against the fork 92 and the rod 90 pushed to the right against the tension of its spring 99, link 95 urges the lever 96 into counterclockwise rotation to draw the release plunger 31 upwardly. Concurrently, link 97 rotates lever 98 so as to move the feed plunger 36 downwardly. It is to be understood that in the Fig. 4 embodiment the hopper 29 and gate means 30 (not shown) may be provided to accommodate the intermittent feeding of the receptacle as previously described.

It is preferred to configurate the receptacles in such fashion as to increase the amount of wall surface in contact with the chilling bath, and to reduce the heat path from the outer wall to the center of the sphere. In Figs. 5 and 6, a spherical receptacle 25A may be blown from glass or plastic, in a mold which provides relatively deep indentations 100.

Preferably, however, the sphere is made by electroplating a suitably shaped core of bismuth or a low melting point alloy such as Wood's metal, following which the plated body is subjected to a temperature sufficient to melt the core, whereupon it may be poured through an opening provided in the remaining shell. In such fashion, the advantageous thermal conductivity of metal may be provided in a receptacle having surface configurations which would defeat regular metal forming practices. The receptacle may be fully or partially filled with water through a suitable opening which may then be sealed with a closure 101.

In the embodiment of Figs. 7 and 8, a sphere 25B may comprise two mating hemispheres stamped or suitably formed from thin metal such as stainless steel. The respective hemispheres may be secured about their equator 102 and sealed. The hemispheres are formed with deep indentations 103 to increase the wall surface and to afford flexibility. The said sphere may be filled with liquid through an opening which is sealed at 104. The Fig. 6 embodiment affords the flexibility of construction which permits a substantially complete filling of water as previously described.

A form of capsule which may be used with the invention is shown in Figs. 9 and 10. The receptacle in this embodiment comprises a toroid 106 which presents a very large exterior surface to the chilling bath. Such toroid may be molded from suitable plastic and comprise interfitting elements 107, 108 mutually secured about a median line 109. The metal plating process referred to above may be resorted to, as well. The liquid content may be introduced in any suitable means and the toroid subsequently sealed.

In the embodiments of Figs. 5 and 7 the indentations are so arranged as not to interfere with the free movement of the spheres through the bath.

It should be understood that a filling other than water may be employed for the respective spheres or capsules. A liquid which has freezing point lower than that of water may be advantageous.

It will be apparent that the representations of jackets through which refrigerants circulate to maintain the low freezing bath temperatures are merely conventionalized showings, inasmuch as any suitable means may be employed. The size of the units, as respects sphere capacity, will of course be governed by the intended use; for restaurants or bars, it is obviously desirable to provide for the chilling of a large number of receptacles or spheres within the bath to have an adequate quantity available during rush hours. For home use, a smaller reserve of chilled spheres will suffice, and the unit may be made an adjunct or accessory to a domestic mechanical refrigerator or "deep freeze" box.

Although the invention has been described by making fully detailed reference to the certain presently preferred embodiments, such detail of description is to be understood in an instructive rather than a limiting sense, many changes being possible within the scope of the claims hereto appended.

I claim:

1. Apparatus for freezing the liquid content of relatively small receptacles; comprising a tank containing a liquid having a freezing point lower than that of the receptacle liquid; means for maintaining said tank liquid in a fluid state but at a temperature below the freezing temperature of said receptacle liquid; an inlet and an outlet whereby said receptacles may be introduced into and removed from said tank; guide means passing through the liquid content of said tank and adapted to accommodate a plurality of said receptacles arranged in a column for guiding said receptacles through said tank liquid, said guide means having side wall openings to permit the said receptacles to be submerged in the tank liquid and said guide means communicating with the inlet and outlet of said tank; a reservoir tube feeding into the inlet of said tank for accommodating a plurality of receptacles prior to entry into said tank, said reservoir tube extending substantially above the level of the tank liquid; a gate chamber at the upper end of said reservoir tube; a hopper for accommodating a quantity of said receptacles; a throat between said hopper and said gate chamber for directing said receptacles thereinto; a pivotally mounted gate having an end portion extending into said gate chamber to hold a receptacle against dropping into said reservoir tube; a plunger disposed axially of said gate chamber and said reservoir tube to be brought, upon downward movement, into engagement with a receptacle held by said gate, and said plunger being operatively associated with said gate movement of said plunger in the direction of said receptacle first rotates said gate to release the said receptacle and then presses against the released receptacle to urge it into the reservoir tube.

2. Apparatus as in claim 1 in which the plunger extends across the outlet of the throat to prevent passage of a receptacle therefrom prior to rotation of said gate into releasing position.

3. Apparatus as in claim 1 in which a gate chamber accommodates but a single receptacle and the plunger has a lost-motion connection with said gate, whereby the plunger, before engagement with the gate to rotate the same into release position, first extends across the path of the immediately adjacent receptacle in said throat to prevent entry of said receptacle into said throat prior to the release by the gate of the receptacle held thereby.

4. A refrigeration unit comprising a chamber containing a volume of fluid having a predetermined freezing point, means for maintaining said fluid at a temperature suitably above the freezing point thereof, an inlet and an outlet to said chamber, guide means within said chamber and communicating with said inlet and said outlet for directing a relatively small sized receptacle through said chamber; a reservoir tube communicating with the inlet end of said guide means for containing a volume of said receptacles prior to the entry thereof into said chamber, said reservoir tube extending substantially above the level of fluid in said container, a hopper for storing a quantity of said receptacles, a throat extending from said hopper into said reservoir tube for conducting receptacles thereto in single file, gate means at the upper end of said reservoir tube and beneath the point of entry of said throat therewith for blocking entry of said receptacles into said reservoir tube, a rotatably mounted agitator in said hopper having a plurality of pockets each of which may receive a single receptacle, said pockets being arranged successively to position a receptacle at the entrance of said throat, and means for concurrently actuating said gate means to release a receptacle for entry into said reservoir tube and for rotating said agitator.

5. In apparatus of the class described, a substantially vertical reservoir tube, a plurality of relatively small receptacles arranged therein in a single column; a gate chamber disposed at the upper end of said tube and communicating therewith; a hopper for a quantity of said receptacles and having a throat through which said receptacles may pass in single file into said gate chamber; a plunger mounted above said gate chamber for reciprocation axially with respect thereto, said plunger extending, during its reciprocal movement, across said throat to prevent passage of a receptacle from said throat into said gate chamber; a gate pivotally mounted adjacent said gate chamber and extending thereinto to hold a receptacle therein; an actuator for said gate extending into said chamber in the descending path of said plunger; cam means on said plunger to engage said actuator after a predetermined downward movement of said plunger wherein said plunger bars entry of a receptacle from said throat into said chamber and rotates said gate out of said chamber to permit release of the receptacle held by said gate; means for returning said plunger to initial position where it is clear of said throat; and means on said plunger to permit the return of said gate into said chamber prior to the position of said plunger at which it is clear of said throat, whereby a succeeding receptacle is free to drop into said gate chamber.

JAMES P. HENDERSON.

REFERENCES CITED

The following references are of record in the file of this patent:

UNITED STATES PATENTS

| Number | Name | Date |
|---|---|---|
| 667,249 | Poirrier et al. | Feb. 5, 1901 |
| 704,286 | Allis | July 8, 1902 |
| 1,109,134 | Millard | Sept. 1, 1914 |
| 1,468,726 | McKim | Sept. 25, 1923 |
| 1,694,436 | Bauer | Dec. 11, 1928 |
| 1,695,956 | Frick | Dec. 18, 1928 |
| 1,697,129 | McCann | Jan. 1, 1929 |
| 1,892,224 | Sorber | Dec. 27, 1932 |
| 1,923,522 | Whitehouse | Aug. 22, 1933 |
| 1,944,726 | Aiken | Jan. 23, 1934 |